United States Patent
Nakayama et al.

(10) Patent No.: US 10,745,559 B2
(45) Date of Patent: Aug. 18, 2020

(54) CURABLE COMPOSITION, METHOD FOR PRODUCING CURABLE COMPOSITION, CURED PRODUCT, AND USE OF CURABLE COMPOSITION

(71) Applicant: LINTEC CORPORATION, Tokyo (JP)

(72) Inventors: Hidekazu Nakayama, Tokyo (JP); Mikihiro Kashio, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 86 days.

(21) Appl. No.: 15/781,558

(22) PCT Filed: Dec. 21, 2016

(86) PCT No.: PCT/JP2016/088245
§ 371 (c)(1),
(2) Date: Jun. 5, 2018

(87) PCT Pub. No.: WO2017/110947
PCT Pub. Date: Jun. 29, 2017

(65) Prior Publication Data
US 2019/0300710 A1    Oct. 3, 2019

(30) Foreign Application Priority Data

Dec. 22, 2015 (JP) ................................. 2015-250313

(51) Int. Cl.
| | | |
|---|---|---|
| *C08L 83/04* | (2006.01) | |
| *C09J 183/04* | (2006.01) | |
| *C08K 3/22* | (2006.01) | |
| *C08K 3/36* | (2006.01) | |
| *C08K 5/5435* | (2006.01) | |
| *C08K 5/544* | (2006.01) | |
| *C08K 9/06* | (2006.01) | |
| *C09K 3/10* | (2006.01) | |
| *C09J 11/04* | (2006.01) | |

(52) U.S. Cl.
CPC ............ *C08L 83/04* (2013.01); *C08K 3/22* (2013.01); *C08K 3/36* (2013.01); *C08K 5/544* (2013.01); *C08K 5/5435* (2013.01); *C08K 9/06* (2013.01); *C09J 11/04* (2013.01); *C09J 183/04* (2013.01); *C09K 3/10* (2013.01); *C08K 2201/005* (2013.01); *C08L 2201/10* (2013.01)

(58) Field of Classification Search
CPC ........ C08K 2201/003; C08K 2201/005; H01L 23/296; H01L 33/56
See application file for complete search history.

(56) References Cited

U.S. PATENT DOCUMENTS

| | | | | |
|---|---|---|---|---|
| 4,177,175 A | * | 12/1979 | Baney ................. | C09D 183/04 428/412 |
| 5,776,235 A | * | 7/1998 | Camilletti ............. | C04B 41/009 427/96.2 |
| 6,153,689 A | * | 11/2000 | Itoh ........................ | C08G 77/16 524/588 |
| 7,297,731 B2 | * | 11/2007 | Walker, Jr. ............ | C03C 25/104 523/212 |
| 10,266,734 B2 | * | 4/2019 | Nakayama ............... | C08K 3/00 |
| 2006/0216438 A1 | * | 9/2006 | Nishimura ............. | G02B 1/105 428/1.31 |
| 2006/0229408 A1 | * | 10/2006 | Shimizu .................. | C08L 83/04 524/588 |
| 2009/0008673 A1 | | 1/2009 | Kato et al. | |
| 2010/0025711 A1 | * | 2/2010 | Barnes .................. | F21V 7/0091 257/98 |
| 2014/0174321 A1 | * | 6/2014 | Huang ................. | C09D 183/06 106/287.11 |

(Continued)

FOREIGN PATENT DOCUMENTS

| | | |
|---|---|---|
| JP | 10-008007 A | 1/1998 |
| JP | 2002-009232 A | 1/2002 |

(Continued)

OTHER PUBLICATIONS

International Search Report for PCT/JP2016/088245 (PCT/ISA/210) dated Feb. 21, 2017.

*Primary Examiner* — Marc S Zimmer
(74) *Attorney, Agent, or Firm* — Birch, Stewart, Kolasch & Birch, LLP

(57) ABSTRACT

The invention is a curable composition comprising the following component (A), component (B) and component (C), Component (A): a curable polysilsesquioxane compound having a repeating unit represented by the following specific formula (a-1)

$$R^1 SiO_{3/2} \qquad (a\text{-}1)$$

Component (B): a particulate having an average primary particle diameter of 5 to 40 nm
Component (C): a particulate having an average primary particle diameter of larger than 0.04 μm to 8 μm, and
a method for producing the curable composition, and
a cured product obtained by curing the curable composition, and
a method for using the curable composition as an adhesive for an optical element-fixing material, and
a method for using the curable composition as a sealant for an optical element-fixing material.
One aspect of the curable composition according to the invention can provide a cured product excellent in adhesiveness, peeling resistance and heat resistance, and a curable composition excellent in workability in coating process.

13 Claims, No Drawings

(56) References Cited

U.S. PATENT DOCUMENTS

| | | | | |
|---|---|---|---|---|
| 2015/0144839 A1* | 5/2015 | Bohmer | ............... | C08K 3/36 |
| | | | | 252/301.36 |
| 2016/0009970 A1 | 1/2016 | Matsui et al. | | |
| 2017/0190843 A1* | 7/2017 | Rathore | ............... | C09D 183/04 |
| 2017/0210956 A1* | 7/2017 | Kashio | ............... | C09J 11/06 |
| 2017/0253782 A1* | 9/2017 | Nakayama | ............... | C08K 3/00 |
| 2017/0275513 A1* | 9/2017 | Nakayama | ............... | C08K 3/00 |

FOREIGN PATENT DOCUMENTS

| | | | |
|---|---|---|---|
| JP | 2004-359933 A | | 12/2004 |
| JP | 2005-263869 A | | 9/2005 |
| JP | 2006-328231 A | | 12/2006 |
| JP | 2007-112975 A | | 5/2007 |
| JP | 2011-202122 A | | 10/2011 |
| JP | 2013-209566 A | | 10/2013 |
| WO | WO 2014-133103 A1 | | 9/2014 |
| WO | WO 2016/031729 | * | 3/2016 |
| WO | WO 2016/031731 | * | 3/2016 |
| WO | WO 2013186689 | * | 12/2019 |

\* cited by examiner

CURABLE COMPOSITION, METHOD FOR PRODUCING CURABLE COMPOSITION, CURED PRODUCT, AND USE OF CURABLE COMPOSITION

TECHNICAL FIELD

The present invention relates to a curable composition which provides a cured product excellent in adhesiveness, peeling resistance and heat resistance and is excellent in workability in a coating process, a method for producing the curable composition, a cured product obtained by curing the curable composition, and a method for using the curable composition as an adhesive or sealant for an optical element-fixing material.

BACKGROUND ART

Conventionally, curable compositions have been variously improved depending on the application, and have been widely used industrially as raw materials for optical components and formed articles, adhesives, coating agents, and the like.

In addition, the curable composition has also attracted attention as a composition for an optical element-fixing material such as an adhesive and a sealant for an optical element in producing an optical element sealant.

The optical elements are exemplified by a light emitter including various lasers such as a semiconductor laser (LD) and a light emitting diode (LED), a light-receiving element, a composite optical element, an optical integrated circuit, and the like.

In recent years, optical elements of blue light or white light having shorter emission peak wavelength have been developed and widely used. Luminance of such a light emitter having short emission peak wavelength has been dramatically enhanced, and accordingly, there has been tendency for a calorific value of the optical element to increase.

However, accompanying the increased luminance of the optical element in recent years, problems have occured that a cured product of the composition for the optical element-fixing material is exposed to heat at higher temperature caused by light or an optical element with higher energy for a long time, resulting in peeling due to deterioration and reduced adhesive strength.

In order to solve this problem, Patent Documents 1 to 3 propose compositions for optical element-fixing materials containing a polysilsesquioxane compound as a main component, and Patent Document 4 proposes a component for a semiconductor light-emitting device using a hydrolyzate/polycondensate of a silane compound, and the like.

However, even by the cured products such as the compositions and components described in Patent Documents 1 to 4, it was difficult to obtain peeling resistance or heat resistance while maintaining sufficient adhesive strength in some cases.

In addition, when a curable composition is applied in fixing an optical element or the like, a coating device having a discharge pipe (needle) as described in Patent Document 5 is normally used. In a coating device having such a discharge pipe, e.g. the discharge pipe vertically descends to approach the object to be coated, a predetermined amount of curable composition is discharged from the tip portion of the pipe, then the discharge pipe ascends to depart from the object to be coated, and the object laterally moves. Repeating this operation allows continuous and efficient coating with the curable composition.

However, in a case of using a highly viscous curable composition or the like, when the discharge pipe ascended, a part of the curable composition once discharged was raised in a form of string without breakage (cobwebbing) in some cases. Additionally, when the object to be coated laterally moved while the raised curable composition remained not broken, the curable composition sometimes adhered to a place other than a place to be rightly coated (resin splash), resulting in peripheral contamination.

This problem can be solved by lowering the viscosity of the curable composition. However, in this case, the discharged curable composition easily spreads, which often caused peripheral contamination.

Consequently, development of a curable composition which can provide a cured product excellent in adhesiveness, peeling resistance and heat resistance and be continuously applied without peripheral contamination (in the present invention, this property is referred to as "excellent workability in coating process), is strongly desired.

CITATION LIST

Patent Literature

Patent Literature 1: JP-A-2004-359933
Patent Literature 2: JP-A-2005-263869
Patent Literature 3: JP-A-2006-328231
Patent Literature 4: JP-A-2007-112975 (US 2009/0008673 A1)
Patent Literature 5: JP-A-2002-009232

SUMMARY OF INVENTION

Technical Problem

The present invention has been made in view of the above-described circumstances of the prior art, and the object of the invention is to provide a curable composition which provides a cured product excellent in adhesiveness, peeling resistance and heat resistance and is excellent in workability in a coating process, a method for producing the curable composition, a cured product obtained by curing the curable composition, and a method for using the curable composition as an adhesive or sealant for an optical element-fixing material.

Solution to Problem

The present inventors repeated intensive studies in order to solve the above problems. As a result, the inventors have found that a curable composition containing a particular curable polysilsesquioxane compound and at least two kinds of particulates having a particular average primary particle diameter provide a cured product excellent in adhesiveness, peeling resistance and heat resistance and is excellent in workability in coating process, and this finding has led to the completion of the invention.

Thus, one aspect of the invention provides curable compositions of the following [1] to [10], a method for producing the curable composition of [1], cured products of [12] and [13], and methods for using the curable composition of [14] and [15].

[1] A curable composition containing the following component (A), component (B) and component (C).

Component (A): a curable polysilsesquioxane compound having a repeating unit represented by the following formula (a-1):

$$R^1SiO_{3/2} \qquad (a\text{-}1)$$

(wherein, $R^1$ represents an alkyl group having 1 to 10 carbon atoms with or without substituents, or an aryl group with or without substituents.)

Component (B): a particulate having an average primary particle diameter of 5 to 40 nm Component (C): a particulate having an average primary particle diameter of larger than 0.04 μm to 8 μm.

[2] The curable composition according to [1], wherein a mass-average molecular weight (Mw) of the curable polysilsesquioxane compound of the component (A) is 800 to 30,000.

[3] The curable composition according to [1] or [2], wherein the component (A) is obtained by polycondensing at least one compound represented by the following formula (a-2) in the presence of a polycondensation catalyst.

$$R^1Si(OR^2)_x(X^1)_{3-x} \qquad (a\text{-}2)$$

(wherein $R^1$ represents the same as described above. $R^2$ represents an alkyl group having 1 to 10 carbon atoms, $X^1$ represents a halogen atom, and x represents an integer of 0 to 3. Each of the plural $R^2$ and plural $X^1$ may be the same or different from each other.)

[4] The curable composition according to any one of [1] to [3], wherein a mass ratio between the component (A) and the component (B) [component (A):component (B)] is 100:0.3 to 100:50.

[5] The curable composition according to any one of [1] to [4], wherein the component (C) is at least one particulate selected from a group consisting of a metal oxide having a surface coated with silicone, silica and silicone.

[6] The curable composition according to any one of [1] to [5], wherein a mass ratio between the component (A) and the component (C) [component (A):component (C)] is 100:0.3 to 100:20.

[7] The curable composition according to any one of [1] to [6], further containing the following component (D).

Component (D): a silane coupling agent having a nitrogen atom in its molecule

[8] The curable composition according to any one of [1] to [7], further containing the following component (E).

Component (E): a silane coupling agent having an acid anhydride structure in its molecule

[9] The curable composition according to any one of [1] to [8], further containing a diluent, wherein a solid content is 50 mass % to lower than 100 mass %.

[10] The curable composition according to [9], wherein a total amount of the composition (A), composition (B) and composition (C) is 50 to 100 mass % based on the whole components excluding the diluent in the curable composition.

[11] A method for producing the curable composition according to any one of [1] to [10], which has the following steps (I) and (II):

Step (1): the step of obtaining the curable polysilsesquioxane compound by polycondensing at least one compound represented by the following formula (a-2) in the presence of the polycondensation catalyst;

$$R^1Si(OR^2)_x(X^1)_{3-x} \qquad (a\text{-}2)$$

(wherein $R^1$ represents the same as described above. $R^2$ represents an alkyl group having 1 to 10 carbon atoms, $X^1$ represents a halogen atom, and x represents an integer of 0 to 3. Each of plural $R^2$ and plural $X^1$ may be the same or different from each other.)

Step (II): the step of mixing the curable polysilsesquioxane compound obtained in the step (I), with the component (B) and the component (C).

[12] A cured product obtained by curing the curable composition according to any one of [1] to [10].

[13] The cured product according to [12], which is an optical element-fixing material.

[14] A method for using the curable composition according to any one of [1] to [10] as an adhesive for an optical element-fixing material.

[15] A method for using the curable composition according to any one of [1] to [10] as a sealant for an optical element-fixing material.

[16] An optical device obtained by using the curable composition according to any one of [1] to [10] as an adhesive for an optical element-fixing material or a sealant for an optical element-fixing material.

Advantageous Effects of Invention

One aspect of the curable composition according to one embodiment of the invention can provide a cured product excellent in adhesiveness, peeling resistance and heat resistance, and a curable composition excellent in workability in coating process.

The curable composition according to one embodiment of the invention can be suitably used as the adhesive for the optical element-fixing material and the sealant for the optical element-fixing material can be obtained.

The cured product according to one embodiment of the invention has excellent heat resistance and high adhesive strength.

DESCRIPTION OF EMBODIMENTS

Hereinafter, the embodiments of the present invention will be classified into 1) a curable composition and a production method thereof, 2) a cured product and 3) a method for using the curable composition, and described in detail.

1) Curable Composition

The curable composition according to one embodiment of the invention contains the following components (A) to (C).

Component (A): a curable polysilsesquioxane compound having a repeating unit represented by the following formula (a-1):

$$R^1SiO_{3/2} \qquad (a\text{-}1)$$

(wherein, $R^1$ represents an alkyl group having 1 to 10 carbon atoms with or without substituents, or an aryl group with or without substituents.)

Component (B): a particulate having an average primary particle diameter of 5 to 40 nm Component (C): a particulate having an average primary particle diameter of larger than 0.04 μm to 8 μm.

Component (A)

The component (A) constituting the curable composition according to one embodiment of the invention is a curable polysilsesquioxane compound having the repeating unit represented by the formula (a-1) (hereinafter referred to as "silane compound polymer (A) in some cases").

Here, the particulate having the average primary particle diameter of 5 to 40 nm (component (B)) and the particulate having the average primary particle diameter of larger than 0.04 μm to 8 μm (component (C)) are excluded.

In the formula (a-1), $R^1$ represents an alkyl group having 1 to 10 carbon atoms with or without substituents, or an aryl group with or without substituents.

Examples of the alkyl group having 1 to 10 carbon atoms represented by $R^1$ include a methyl group, an ethyl group, an n-propyl group, an isopropyl group, an n-butyl group, an isobutyl group, an s-butyl group, a t-butyl group, an n-pentyl group, an n-hexyl group, an n-octyl group, an n-nonyl group and the like. Above all, the alkyl group having 1 to 6 carbon atoms is preferred, and the alkyl group having 1 to 3 carbon atoms is more preferred.

Examples of the substituents in the alkyl group having 1 to 10 carbon atoms represented by $R^1$ with substituents include a halogen atom such as a fluorine atom, a chlorine atom and a bromine atom; a cyano group; or a group represented by the formula: OG.

G represents a hydroxyl group-protecting group. The hydroxyl group-protecting group is not particularly limited and exemplified by known protecting groups known as hydroxyl group-protecting groups. Examples thereof include e.g. an acyl-based protecting group; a silyl-based protective group such as a trimethylsilyl group, a triethylsilyl group, a t-butyldimethylsilyl group and a t-butyldiphenylsilyl group; an acetal-based protective group such as a methoxymethyl group, a methoxyethoxymethyl group, a 1-ethoxyethyl group, a tetrahydropyran-2-yl group and a tetrahydrofuran-2-yl group; an alkoxycarbonyl-based protecting group such as a t-butoxycarbonyl group; an ether-based protecting group such as a methyl group, an ethyl group, a t-butyl group, an octyl group, an allyl group, a triphenylmethyl group, a benzyl group, a p-methoxybenzyl group, a fluorenyl group, a trityl group and a benzhydryl group; and the like. Above all, the acyl-based protecting group is preferred as G.

The acyl-based protecting group is specifically a group represented by the formula: —C(=O) R. In the formula, R represents an alkyl group having 1 to 6 carbon atoms such as a methyl group, an ethyl group, an n-propyl group, an isopropyl group, an n-butyl group, an isobutyl group, an s-butyl group, a t-butyl group and an n-pentyl group; or a phenyl group with or without a substituent.

Examples of the substituents in the phenyl group represented by R having a substituent include an alkyl group such as a methyl group, an ethyl group, an n-propyl group, an isopropyl group, an n-butyl group, an s-butyl group, an isobutyl group, a t-butyl group, an n-pentyl group, an n-hexyl group, an n-heptyl group, an n-octyl group and an isooctyl group; a halogen atom such as a fluorine atom, a chlorine atom and a bromine atom; and an alkoxy group such as a methoxy group and an ethoxy group.

Examples of the aryl group represented by $R^1$ include a phenyl group, a 1-naphthyl group, a 2-naphthyl group and the like.

Examples of the substituent in the aryl group represented by $R^1$ having substituents include an alkyl group such as a methyl group, an ethyl group, an n-propyl group, an isopropyl group, an n-butyl group, an s-butyl group, an isobutyl group, a t-butyl group, an n-pentyl group, an n-hexyl group, an n-heptyl group, an n-octyl group and an isooctyl group; a halogen atom such as a fluorine atom, a chlorine atom and a bromine atom; and an alkoxy group such as a methoxy group and an ethoxy group.

Above all, $R^1$ is preferably an alkyl group having 1 to 10 carbon atoms, more preferably 1 to 6 carbon atoms, and even more preferably 1 to 3 carbon atoms with or without a substituent because a curable composition capable of providing a cured product more excellent in heat resistance and adhesiveness can be easily obtained.

The repeating unit represented by the above formula (a-1) is represented by the following formula. In the present specification, $O_{1/2}$ indicates that an oxygen atom is shared with an adjacent repeating unit.

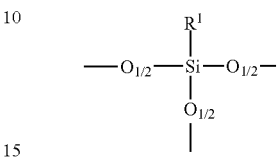

Thus, the silane compound polymer (A) has a partial structure which is collectively called a T site, in which three oxygen atoms bind to a silicon atom and one other group (R'—) binds to the silicon atom.

Specific examples of the T site include groups represented by the following formulas (a-3) to (a-5).

(a-3)

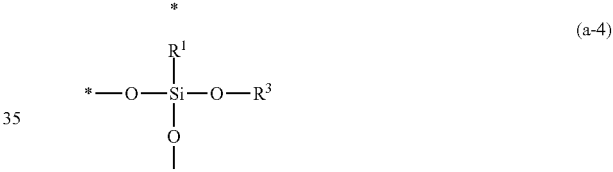

(a-4)

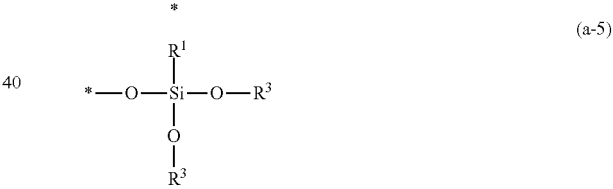

(a-5)

In the formulas (a-3) to (a-5), $R^1$ represents the same as described above. $R^3$ represents a hydrogen atom or an alkyl group having 1 to 10 carbon atoms. Examples of the alkyl group having 1 to 10 carbon atoms represented by $R^3$ include a methyl group, an ethyl group, an n-propyl group, an isopropyl group, an n-butyl group, an s-butyl group, an isobutyl group, a t-butyl group and the like. The plural $R^3$ may be all the same or different from each other. Additionally, in the above formulas (a-3) to (a-5), * is bound to Si atom.

The silane compound polymer (A) is soluble in various organic solvents such as: a ketone-based solvent such as acetone; an aromatic hydrocarbon-based solvent such as benzene; a sulfur-containing solvent such as dimethylsulfoxide; an ether-based solvent such as tetrahydrofuran; an ester-based solvent such as ethyl acetate; a halogen-containing solvent such as chloroform; and a mixed solvent including two or more kinds of them, and therefore $^{29}$Si-NMR of the silane compound polymer (A) in a solution state can be measured using these solvents.

As a result of measuring the $^{29}$Si-NMR of the silane compound polymer (A) in the solution state, e.g. when $R^1$ is a methyl group, a peak (T3) attributed to a silicon atom in the structure represented by the formula (a-3) is observed at a region of −70 ppm to less than −61 ppm, a peak (T2) attributed to a silicon atom in the structure represented by the formula (a-4) is observed at a region of −60 ppm to less than −54 ppm, and a peak (T1) attributed to a silicon atom in the structure represented by the formula (a-5) is observed at a region of −53 ppm to less than −45 ppm.

The silane compound polymer (A) has an integrated value of T3 of preferably 60 to 90% based on the total value of the integrated values of T1, T2 and T3.

The content rate of the repeating unit represented by the formula (a-1) in the silane compound polymer (A) is preferably 40 mass % or higher, more preferably 70 mass % or higher, even more preferably 90 mass % or higher, and particularly preferably 100 mass % based on the total repeating units.

The content rate of the repeating unit represented by the formula (a-1) in the silane compound polymer (A) can be determined e.g. by measuring 2Si-NMR of the silane compound polymer (A).

The silane compound polymer (A) may be a polymer including one type of $R^1$ (homopolymer) or a polymer including two or more types of $R^1$ (copolymer).

When the silane compound polymer (A) is a copolymer, the silane compound polymer (A) may be any of a random copolymer, a block copolymer, a graft copolymer, an alternating copolymer or the like, but, from the viewpoint of ease of production and the like, the random copolymer is preferred.

In addition, the structure of the silane compound polymer (A) may be any of a ladder-type structure, a double decker-type structure, a cage-type structure, a partial cleavage cage-type structure, a ring-type structure or a random-type structure.

The mass-average molecular weight (Mw) of the silane compound polymer (A) is within a range of normally 800 to 30,000, preferably 1,000 to 20,000, more preferably 1,200 to 15,000, and particularly preferably 3,000 to 10,000. When the silane compound polymer (A) having a mass-average molecular weight (Mw) within the above range is used, a cured product excellent in adhesiveness, peeling resistance and heat resistance can be provided, and a curable composition excellent in workability in coating process can be easily obtained.

The molecular weight distribution (Mw/Mn) of the silane compound polymer (A) is not particularly limited but is normally within a range of 1.0 to 10.0, preferably 1.1 to 6.0. When the silane compound polymer (A) having the molecular weight distribution (Mw/Mn) within the above range is used, a cured product more excellent in adhesiveness and heat resistance can be easily obtained.

The mass-average molecular weight (Mw) and the number average molecular weight (Mn) can be determined as e.g. standard polystyrene-equivalent values by gel permeation chromatography (GPC) using tetrahydrofuran (THF) as a solvent.

In the present invention, the silane compound polymer (A) may be used either alone or in combination of two or more kinds.

The method for producing the silane compound polymer (A) is not particularly limited. For example, the silane compound polymer (A) can be produced by polycondensing at least one silane compound (1) represented by the following formula (a-2):

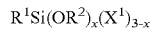  (a-2)

(wherein $R^1$ represents the same as described above. $R^2$ represents an alkyl group having 1 to 10 carbon atoms, $X^1$ represents a halogen atom, and x represents an integer of 0 to 3. Each of plural $R^2$ and plural $X^1$ may be the same or different from each other.).

Examples of the alkyl group having 1 to 10 carbon atoms represented by $R^2$ include the same as shown for the alkyl group having 1 to 10 carbon atoms represented by $R^3$.

Examples of the halogen atom represented by $X^1$ include a chlorine atom, a bromine atom and the like.

Specific examples of the silane compound (I) include alkyltrialkoxysilane compounds such as methyltrimethoxysilane, methyltriethoxysilane, ethyltrimethoxysilane, ethyltriethoxysilane, ethyltripropoxysilane, n-propyltrimethoxysilane, n-propyltriethoxysilane, n-propyltripropoxysilane, n-propyltributoxysilane, n-butyltrimethoxysilane, isobutyltrimethoxysilane, n-pentyltrimethoxysilane, n-hexyltrimethoxysilane and isooctyltriethoxysi lane;

alkylhalogenoalkoxysilane compounds such as methylchlorodimethoxysilane, methylchlorodiethoxysilane, methyldichloromethoxysilane, methylbromodimethoxysilane, ethylchlorodimethoxysi lane, ethylchlorodiethoxysilane, ethyldichloromethoxysilane, ethylbromodimethoxysilane, n-propylchlorodimethoxysilane, n-propyldichloromethoxysilane, n-butylchlorodimethoxysilane and n-butyldichloromethoxysilane;

alkyltrihalogenosilane compounds such as methyltrichlorosilane, methyltribromosilane, ethyltrichlorosilane, ethyltribromosilane, n-propyltrichlorosilane, n-propyltribromosilane, n-butyltrichlorosilane, isobutyltrichlorosilane, n-pentyltrichlorosilane, n-hexyltrichlorosilane and isooctyltrichlorosilane; and the like.

Above all, alkyltrialkoxysilane compounds are preferred as the silane compound (1), because a curable composition providing a cured product more excellent in adhesiveness can be obtained.

The silane compound (1) may be used either alone or in combination of two or more kinds.

The method for polycondensing the silane compound (1) is not particularly limited. The method is exemplified by a method in which a predetermined amount of a polycondensation catalyst is added to the silane compound (1) with or without a solvent and stirred at a predetermined temperature, for example. More specific examples thereof include (a) a method in which a predetermined amount of an acid catalyst is added to the silane compound (1) and stirred at a predetermined temperature, (b) a method in which a predetermined amount of a base catalyst is added to the silane compound (1) and stirred at a predetermined temperature, (c) a method in which a predetermined amount of an acid catalyst is added to the silane compound (1), stirred at a predetermined temperature, to which subsequently an excess amount of a base catalyst is added to make the reaction system basic, and stirred at a predetermined temperature, and the like. Above all, the method (a) or (c) is preferred because the desired silane compound polymer (A) can be efficiently obtained.

The polycondensation catalyst for use may be any of an acid catalyst and a base catalyst. In addition, two or more polycondensation catalysts may be used in combination, but it is preferable to use at least an acid catalyst.

Examples of the acid catalyst include an inorganic acid such as phosphoric acid, hydrochloric acid, boric acid, sulfuric acid and nitric acid; an organic acid such as citric acid, acetic acid, methanesulfonic acid, trifluoromethanesulfonic acid, benzenesulfonic acid and p-toluenesulfonic acid; and the like. Above all, at least one selected from phosphoric acid, hydrochloric acid, boric acid, sulfuric acid, citric acid, acetic acid and methanesulfonic acid is preferred.

Examples of the basic catalyst include ammonia water; an organic base such as trimethylamine, triethylamine, lithium diisopropylamide, lithium bis(trimethylsilyl)amide, pyridine, 1,8-diazabicyclo[5.4.0]-7-undecene, aniline, picoline, 1,4-diazabicyclo[2.2.2]octane and imidazole; an organic salt hydroxide such as tetramethylammonium hydroxide and tetraethylammonium hydroxide; a metal alkoxide such as sodium methoxide, sodium ethoxide, sodium t-butoxide and potassium t-butoxide; a metal hydride such as sodium hydride and calcium hydride; a metal hydroxide such as sodium hydroxide, potassium hydroxide and calcium hydroxide; a metal carbonate such as sodium carbonate, potassium carbonate and magnesium carbonate; a metal hydrogencarbonate such as sodium hydrogencarbonate and potassium hydrogencarbonate; and the like.

The polycondensation catalyst is normally used in an amount of 0.05 to 10 mol %, preferably 0.1 to 5 mol % based on the total molar amount of the silane compound (1).

When a solvent is used, the solvent for use can be appropriately selected depending on the type or the like of the silane compound (1). Examples of the solvent include water; aromatic hydrocarbons such as benzene, toluene and xylene; esters such as methyl acetate, ethyl acetate, propyl acetate, butyl acetate and methyl propionate; ketones such as acetone, methylethylketone, methylisobutylketone and cyclohexanone; alcohols such as methyl alcohol, ethyl alcohol, n-propyl alcohol, isopropyl alcohol, n-butyl alcohol, isobutyl alcohol, s-butyl alcohol and t-butyl alcohol; and the like. These solvents may be used either alone or in combination of two or more kinds. In addition, when adopting the method (c), polycondensation reaction in an aqueous system in the presence of an acid catalyst may be conducted followed by further polycondensation reaction under a basic condition by adding an organic solvent and an excess amount of basic catalyst (such as ammonia water) to the reaction solution.

The solvent is used in an amount of 0.1 to 10 liters, preferably 0.1 to 2 liters per 1 mol of the total molar amount of the silane compound (1).

The temperature for polycondensing the silane compound (1) is normally within a range of 0° C. to a boiling point of the solvent for use, and preferably 20 to 100° C. If the reaction temperature is too low, progress of the polycondensation reaction may be insufficient. On the other hand, if the reaction temperature is too high, it may be difficult to suppress gelation. The reaction is normally completed in 30 minutes to 20 hours.

After completion of the reaction, neutralization is carried out by adding an alkali aqueous solution such as sodium hydrogencarbonate to the reaction solution when using an acid catalyst, or by adding an acid such as hydrochloric acid to the reaction solution when using a base catalyst, and the resulting salt may be removed by filtration, washing with water, or the like to obtain the desired silane compound polymer (A).

When the silane compound polymer (A) is produced by the above method, a part without dealcoholization or the like at $OR^2$ or $X^1$ in the silane compound (1) remains in the silane compound polymer (A). Thereby, the silane compound polymer (A) may contain the repeating units represented by the formulas (a-4) and (a-5) besides the repeating unit represented by the formula (a-3).

Component (B)

The component (B) constituting the curable composition according to one embodiment of the invention is a particulate having an average primary particle diameter of 5 to 40 nm.

The curable composition containing the component (B) is excellent in workability in coating process.

The average primary particle diameter of the particulate is preferably 5 to 30 nm, and more preferably 5 to 20 nm. When the average primary particle diameter is within the above range, a curable composition more excellent in workability in coating process can be obtained.

The average primary particle diameter of the particulate of the component (B) can be determined by observing the shape of the particulate using a transmission electron microscope.

The particulate of the component (B) has a specific surface area of preferably 10 to 500 $m^2/g$, and more preferably 20 to 300 $m^2/g$. When the specific surface area is within the above range, a curable composition more excellent in workability in coating process can be easily obtained.

The specific surface area can be determined by a BET multi-point method.

The shape of the particulate may be any of a sphere shape, a chain shape, a needle shape, a plate shape, a strip shape, a stick shape, a fiber shape or the like, but the sphere shape is preferred. Here, the sphere shape means not only a true sphere but also a substantially sphere shape including polyhedron shapes which can bear similarity to a sphere, such as a spheroid shape, an egg shape, a Kompeito (Japanese confetti) shape and a cocoon shape.

The constituents of the particulate are not particularly limited and include a metal; a metal oxide; a mineral; a metal carbonate such as calcium carbonate and magnesium carbonate; a metal sulfate such as calcium sulfate and barium sulfate; a metal hydroxide such as aluminum hydroxide; a metal silicate such as aluminum silicate, calcium silicate and magnesium silicate; an inorganic component such as silica; silicone; an organic component such as acryl-based polymer; and the like.

In addition, the particulate for use may have a modified surface.

The term "metal" refers to elements belonging to Group 1 (excluding H), Groups 2 to 11, Group 12 (excluding Hg), Group 13 (excluding B), Group 14 (excluding C and Si), Group 15 (excluding N, P, As and Sb), or Group 16 (excluding O, S, Se, Te and Po) in the periodic table.

Examples of the metal oxide include e.g. titanium oxide, alumina, boehmite, chromium oxide, nickel oxide, copper oxide, titanium oxide, zirconium oxide, indium oxide, zinc oxide, a composite oxide thereof, and the like. The particulates of the metal oxides also include sol particles composed of these metal oxides.

Examples of minerals include smectite, bentonite and the like.

Examples of the smectite include montmorillonite, beidellite, hectorite, saponite, stevensite, nontronite, sauconite and the like.

In the present invention, these particulates may be used either alone or in combination of two or more kinds.

Examples of the silica include a dry silica, a wet silica, a surface-modified silica (silica having a modified surface) and the like.

Above all, in the present invention, the silica, the metal oxide and the mineral are preferred, and the silica is more preferred, because a cured product excellent in transparency can be easily obtained.

Among the silicas, the surface-modified silica is preferred, and a hydrophobic surface-modified silica is more preferred, because a curable composition more excellent in workability in coating process can be easily obtained.

Examples of the hydrophobic surface-modified silica include a silica whose surface is bound to a trialkylsilyl group having tri(1 to 20 carbon atoms) such as a trimethylsilyl group, a dialkylsilyl group having di(1 to 20 carbon atoms) such as a dimethylsilyl group, and an alkylsilyl group having 1 to 20 carbon atoms such as an octylsilyl group: a silica having a surface treated with a silicone oil: and the like.

The hydrophobic surface-modified silica can be obtained e.g. by modifying the surface of the silica particle using a silane coupling agent having a trialkylsilyl group having tri(1 to 20 carbon atoms), a dialkylsilyl group having di(1 to 20 carbon atoms), an alkylsilyl group having 1 to 20 carbon atoms or the like, or alternatively by treating the silica particle with a silicone oil. In addition, a commercially available surface-modified silica can be used as is.

The component (B) is used in a ratio between the component (A) and the component (B), as a mass ratio of the component (A) and the component (B) [component (A): component (B)], of preferably 100:0.1 to 100:90, more preferably 100:0.2 to 100:60, more preferably 100:0.3 to 100:50, more preferably 100:0.5 to 100:40, and more preferably 100:0.8 to 100:30. If the component (B) is used in an amount smaller than the above range, the desired peeling resistance effect may be hardly obtained, and if it is used in an amount larger than the above range, the adhesive strength may be reduced.

Component (C)

The component (C) constituting the curable composition according to one embodiment of the invention is a particulate having an average primary particle diameter of larger than 0.04 μm to 8 μm.

The particulate is not particularly limited, and may be a particulate including inorganic substances or a particulate including organic substances. The constituents of the particulate include: an inorganic substance including a metal; a metal oxide; a mineral; a metal carbonate such as calcium carbonate and magnesium carbonate; a metal sulfate such as calcium sulfate and barium sulfate; a metal hydroxide such as aluminum hydroxide; a metal silicate such as aluminum silicate, calcium silicate and magnesium silicate; silica; silicone; a metal oxide having a surface coated with silicone; and the like: as well as an organic substance including polysilsesquioxane; acrylic beads; and the like.

These particulates may be used in combination of two or more kinds.

Here, the term "metal" refers to elements belonging to Group 1 (excluding H), Groups 2 to 11, Group 12 (excluding Hg), Group 13 (excluding B), Group 14 (excluding C and Si), Group 15 (excluding N, P, As and Sb), or Group 16 (excluding O, S, Se, Te and Po) in the periodic table.

The silica may be any of a dry silica, a wet silica and a surface-modified silica, or may be a mixture including the two or more of them.

The term "silicone" means an artificial polymer compound having a main skeleton based on a siloxane bond. Examples thereof include e.g. dimethylpolysiloxane, diphenylpolysiloxane, methylphenylpolysiloxane and the like.

Examples of the metal oxide include e.g. titanium oxide, alumina, boehmite, chromium oxide, nickel oxide, copper oxide, titanium oxide, zirconium oxide, indium oxide, zinc oxide, a composite oxide thereof, and the like. The particulates of the metal oxides also include sol particles composed of these metal oxides.

Examples of minerals include smectite, bentonite and the like.

Examples of the smectite include montmorillonite, beidellite, hectorite, saponite, stevensite, nontronite, sauconite and the like.

Above all, in the present invention, at least one particulate selected from a group consisting of a silica, silicone, and a metal oxide having a surface coated with silicone is preferred, and silica and silicone are more preferred, because the object of the present invention can be easily exhibited.

The shape of the particulate may be any of a sphere shape, a chain shape, a needle shape, a plate shape, a strip shape, a stick shape, a fiber shape or the like, but the sphere shape is preferred. Here, the sphere shape means not only a true sphere but also a substantially sphere shape including polyhedron shapes which can bear similarity to a sphere, such as a spheroid shape, an egg shape, a Kompeito shape and a cocoon shape.

The average primary particle diameter of the particulates is larger than 0.04 μm to 8 μm. When it is larger than 0.04 μm, the effect of adding particulates is obtained. When it is 8 μm or smaller, the dispersibility of the obtained curable composition is good.

The average primary particle diameter is more preferably 0.06 to 7 μm, even more preferably 0.3 to 6 μm, and particularly preferably 1 to 4 μm, from the viewpoint of achieving both peeling resistance and dispersibility.

The average primary particle diameter of the component (C) can be determined by measuring a particle size distribution according to a laser scattering method using a laser diffraction/scattering type particle size distribution measuring device (e.g. product name "LA-920" manufactured by HORIBA, Ltd.), or the like.

The component (C) is used in a ratio between the component (A) and the component (C), as a mass ratio of the component (A) and the component (C) [component (A): component (C)], of normally 100:0.1 to 100:40, preferably 100:0.2 to 100:30, more preferably 100:0.3 to 100:20, more preferably 100:0.5 to 100:15, and more preferably 100:0.8 to 100:12. If the component (C) is used in an amount smaller than the above range, the desired peeling resistance effect is hardly obtained, and if it is used in an amount larger than the above range, the adhesive strength is reduced, and thus the ranges are unpreferable.

Note that the component (B) and the component (C) may include the same materials or different materials.

The curable composition according to one embodiment of the invention may contain a silane coupling agent having a nitrogen atom in its molecule (hereinafter referred to as "silane coupling agent (D)" in some cases) as the component (D). The curable composition containing the component (D) provides a cured product which is more excellent in workability in coating process, and in adhesiveness, peeling resistance and heat resistance.

The silane coupling agent (D) is not particularly limited as long as it is a silane coupling agent having a nitrogen atom in its molecule. Examples thereof include a trialkoxysilane compound represented by the following formula (d-1), a dialkoxyalkylsilane compound or a dialkoxyarylsilane compound represented by the following formula (d-2), and the like.

$(R^a)_3 SiR^c$         (d-1)

$(R^a)_2 (R^b) SiR^c$         (d-2)

In the above formulas, $R^a$ represents an alkoxy group having 1 to 6 carbon atoms such as a methoxy group, an ethoxy group, an n-propoxy group, an isopropoxy group, an n-butoxy group and a t-butoxy group. Each of the plural $R^a$ may be the same or different from each other.

$R^b$ represents an alkyl group having 1 to 6 carbon atoms such as a methyl group, an ethyl group, an n-propyl group, an isopropyl group, an n-butyl group and a t-butyl group; or an aryl group with or without substituents, such as a phenyl group, a 4-chlorophenyl group, a 4-methylphenyl group and a 1-naphthyl group.

$R^c$ represents an organic group having a nitrogen atom and 1 to 10 carbon atoms. Furthermore, $R^c$ may bind to another group containing a silicon atom.

Specific examples of the organic group represented by $R^c$ and having 1 to 10 carbon atoms include an N-2-(aminoethyl)-3-aminopropyl group, a 3-aminopropyl group, an N-(1,3-dimethyl-butylidene) aminopropyl group, a 3-ureidopropyl group, an N-phenyl-aminopropyl group and the like.

Among the compounds represented by the formula (d-1) or (d-2), when $R^c$ is an organic group bound to another group containing a silicon atom, the compounds include a compound which binds to another silicon atom through an isocyanurate skeleton to constitute an isocyanurate-based silane coupling agent, and a compound which binds to another silicon atom through an urea skeleton to constitute an urea-based silane coupling agent.

Above all, as the silane coupling agent (D), the isocyanurate-based silane coupling agent, and the urea-based silane coupling agent are preferred, and a compound having 4 or more alkoxy groups bound to a silicon atom in its molecule is more preferred, because a cured product having a higher adhesive strength can be easily obtained.

Having 4 or more alkoxy groups bound to a silicon atom means that the total number of alkoxy groups bound to the same silicon atom and alkoxy groups bound to a different silicon atoms is 4 or more.

The isocyanurate-based silane coupling agent having 4 or more alkoxy groups bound to a silicon atom is exemplified by a compound represented by the following formula (d-3), and the urea-based silane coupling agent having 4 or more alkoxy groups bound to a silicon atom is exemplified by a compound represented by the following formula (d-4).

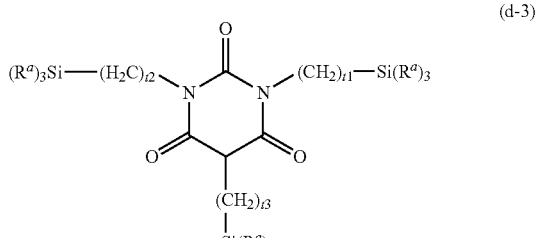

(d-3)

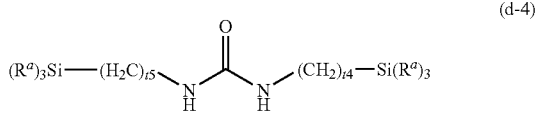

(d-4)

In the formula, $R^a$ represents the same as described above.

Each of t1 to t5 independently represents an integer of 1 to 10, preferably 1 to 6, and particularly preferably 3.

Specific examples of the compound represented by the formula (d-3) include 1,3,5-N-tris[(tri(1-6C)alkoxy)silyl (1-1° C.)alkyl] isocyanurate such as 1,3,5-N-tris(3-trimethoxysilylpropyl) isocyanurate, 1,3,5-N-tris(3-triethoxysilylpropyl) isocyanurate, 1,3,5-N-tris(3-tri-i-propoxysilylpropyl) isocyanurate and 1,3,5-N-tris(3-tributoxysilylpropyl) isocyanurate; 1,3,5-N-tris[(di(1-6C)alkoxy)silyl (1-10C)alkyl] isocyanurate such as 1,3,5-N-tris (3-dithoxymethylsilylpropyl) isocyanurate, 1,3,5-N-tris(3-dimethoxyethylsilylpropyl) isocyanurate, 1,3,5-N-tris(3-dimethoxy-i-propylsilylpropyl) isocyanurate, 1,3,5-N-tris (3-dimethoxy-n-propylsilylpropyl) isocyanurate, 1,3,5-N-tris(3-dimethoxyphenylsilylpropyl) isocyanurate, 1,3,5-N-tris(3-diethoxymethylsilylpropyl) isocyanurate, 1,3,5-N-tris (3-diethoxyethylsilylpropyl) isocyanurate, 1,3,5-N-tris(3-diethoxy-i-propylsilylpropyl) isocyanurate, 1,3,5-N-tris(3-diethoxy-n-propylsilylpropyl) isocyanurate, 1,3,5-N-tris(3-diethoxyphenylsilylpropyl) isocyanurate, 1,3,5-N-tris(3-di-i-propoxymethylsilylpropyl) isocyanurate, 1,3,5-N-tris(3-di-i-propoxyethylsilylpropyl) isocyanurate, 1,3,5-N-tris(3-di-i-propoxy-i-propylsilylpropyl) isocyanurate, 1,3,5-N-tris (3-di-i-propoxy-n-propylsilylpropyl) isocyanurate, 1,3,5-N-tris(3-di-i-propoxyphenylsilylpropyl) isocyanurate, 1,3,5-N-tris(3-dibutoxymethylsilylpropyl) isocyanurate, 1,3,5-N-tris (3-dibutoxyethylsilylpropyl) isocyanurate, 1,3,5-N-tris(3-dibutoxy-i-propylsilylpropyl) isocyanurate, 1,3,5-N-tris(3-dibutoxy-n-propylsilylpropyl) isocyanurate and 1,3,5-N-tris (3-dibutoxyphenylsilylpropyl) isocyanurate; and the like.

Specific examples of the compound represented by the formula (d-4) include N, N'-bis[(tri(1-6C)alkoxysilyl) (1-6C)alkyl] urea such as N,N'-bis(3-trimethoxysilylpropyl) urea, N,N'-bis(3-triethoxysilylpropyl) urea, N,N'-bis(3-tripropoxysilylpropyl) urea, N,N'-bis(3-tributoxysilylpropyl) urea and N,N'-bis(2-trimethoxysilylethyl) urea; N,N'-bis[(di(1-6C)alkoxy (1-6C)alkylsilyl (1-10C)alkyl] urea such as N,N'-bis(3-dimethoxymethylsilylpropyl) urea, N,N'-bis(3-dimethoxyethylsilylpropyl) urea and N,N'-bis(3-diethoxymethylsilylpropyl) urea; N,N'-bis[(di(1-6C)alkoxy (6-20C)arylsilyl (1-10C)alkyl] urea such as N,N'-bis(3-dimethoxyphenylsilylpropyl) urea and N,N'-bis(3-diethoxyphenylsilylpropyl) urea; and the like.

The silane coupling agent (D) may be used either alone or in combination of two or more kinds.

Above all, as the silane coupling agent (D), 1,3,5-N-tris (3-trimethoxysilylpropyl) isocyanurate, 1,3,5-N-tris(3-triethoxysilylpropyl) isocyanurate (hereinafter referred to as "isocyanurate compound"), N,N'-bis(3-trimethoxysilylpropyl) urea, N,N'-bis(3-triethoxysilylpropyl) urea (hereinafter referred to as "urea compound") and a combination of the isocyanurate compound and the urea compound are preferably used.

When the isocyanurate compound and the urea compound are used in combination, they are used, in a mass ratio between (isocyanurate compound) and (urea compound) of preferably 100:1 to 100:200, and more preferably 100:10 to 100:110. When the isocyanurate compound and the urea compound are used in combination in such a ratio, a curable composition which provides a cured product more excellent in heat resistance and adhesiveness can be obtained.

When the curable composition according to one embodiment of the invention contains the component (D), the content of the component (D) is not particularly limited, but the mass ratio between the component (A) and the component (D) [component (A):component (D)] is preferably 100:0.1 to 100:90, more preferably 100:0.2 to 100:60, more preferably 100:0.3 to 100:40, more preferably 100:1 to 100:30, and even more preferably 100:3 to 100:25.

The cured product of the curable composition containing the component (A) and the component (D) in such a ratio is more excellent in heat resistance and adhesiveness.

The curable composition according to one embodiment of the invention may contain a silane coupling agent having an acid anhydride structure (hereinafter referred to as "silane coupling agent (E)" in some cases) as the component (E), in its molecule.

The silane coupling agent (E) is an organosilicon compound possessing both a group having an acid anhydride structure (Q) and a hydrolyzable group ($R^b$) in one molecule. Specifically, it is a compound represented by the following formula (e-1).

The curable composition containing the component (E) provides a cured product more excellent in workability in coating process, and in adhesiveness, peeling resistance and heat resistance.

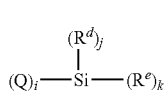
(e-1)

In the formula, Q represents an acid anhydride structure, $R^d$ represents an alkyl group having 1 to 6 carbon atoms or a phenyl group with or without substituents, $R^e$ represents an alkoxy group having 1 to 6 carbon atoms or a halogen atom, each of i and k represents an integer of 1 to 3, and j represents an integer of 0 to 2, wherein i+j+k=4. When j is 2, each of $R^d$ groups may be the same or different from each other. When k is 2 or 3, each of plural R may be the same or different from each other. When i is 2 or 3, each of plural Q may be the same or different from each other.

Q is exemplified by groups represented by the following formulas:

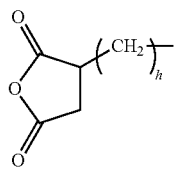
(Q1)

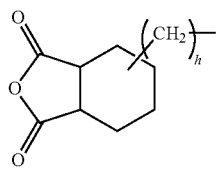
(Q2)

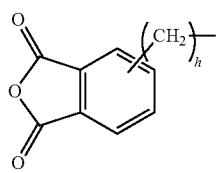
(Q3)

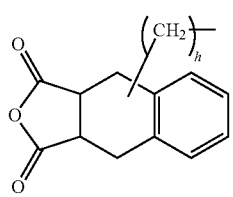
(Q4)

(wherein h represents an integer of 0 to 10), and the group represented by (Q1) is particularly preferred.

In formula (e-1), examples of the alkyl group having 1 to 6 carbon atoms represented by $R^d$ include the same as those exemplified as the alkyl group having 1 to 6 carbon atoms represented for $R^1$ described above, and examples of the phenyl group with or without substituents include the same as those exemplified for R described above.

Examples of the alkoxy group having 1 to 6 carbon atoms represented by $R^e$ include a methoxy group, an ethoxy group, a propoxy group, an isopropoxy group, a butoxy group, a t-butoxy group and the like.

Examples of the halogen atom represented by $R^e$ include a chlorine atom and a bromine atom and the like.

Above all, the compound represented by formula (e-1) is preferably a compound represented by the following formula (e-2):

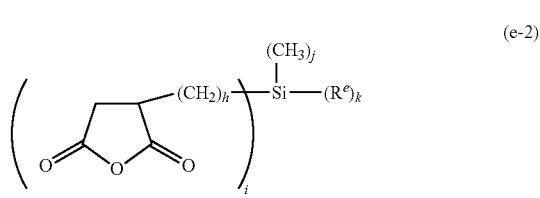
(e-2)

(wherein $R^e$, h, i, j and k represent the same as described above.). In the formula, h is preferably an integer of 2 to 8, more preferably 2 or 3, and particularly preferably 3.

Specific examples of the silane coupling agent represented by the above formula (e-2) include tri(1-6C)alkoxysilyl (2-8C)alkylsuccinic anhydride such as 2-(trimethoxysilyl)ethylsuccinic anhydride, 2-(triethoxysilyl) ethylsuccinic anhydride, 3-(trimethoxysilyl)propylsuccinic anhydride and 3-(triethoxysilyl)propylsuccinic anhydride; di(1-6C)alkoxymethylsilyl (2-8C)alkylsuccinic anhydride such as 2-(dimethoxymethylsilyl)ethylsuccinic anhydride; (1-6C)alkoxydimethylsilyl (2-8C)alkylsuccinic anhydride such as 2-(methoxydimethylsilyl)ethylsuccinic anhydride;

trihalogenosilyl (2-8C)alkylsuccinic anhydride such as 2-(trichlorosilyl)ethylsuccinic anhydride and 2-(tribromosilyl)ethylsuccinic anhydride;

dihalogenomethylsilyl (2-8C)alkylsuccinic anhydride such as 2-(dichloromethylsilyl)ethylsuccinic anhydride;

halogenodimethylsilyl (2-8C)alkylsuccinic anhydride such as 2-(chlorodimethylsilyl) ethylsuccinic anhydride; and the like.

The silane coupling agent (E) may be used either alone or in combination of two or more kinds.

Above all, as the silane coupling agent (E), tri(1-6C) alkoxysilyl (2-8C)alkylsuccinic anhydride is preferred, and 3-(trimethoxysilyl)propylsuccinic anhydride and 3-(triethoxysilyl)propylsuccinic anhydride are particularly preferred.

When the curable composition according to one embodiment of the invention contains the component (E), the content of the component (E) is not particularly limited, but the mass ratio between the component (A) and the component (E) [component (A):component (E)] is preferably 100: 0.01 to 100:40, more preferably 100:0.01 to 100:30, and more preferably 100:0.1 to 100:10.

The cured product of the curable composition containing the component (A) and the component (E) in such a ratio is more excellent in heat resistance and adhesiveness.

The curable composition according to one embodiment of the invention may contain a diluent as a component (F).

The diluent is used for the purpose of providing fluidity to the curable composition according to one embodiment of the invention.

Examples of the diluent include e.g. acetates such as diethyleneglycol monobutylether acetate and 1,6-hexanediol diacetate; tipropyleneglycol-n-butylether; diglycidyl ethers such as glycerin diglycidyl ether, butanediol diglycidyl ether, diglycidyl aniline, neopentylglycol glycidyl ether, cyclohexanedimethanol diglycidyl ether, alkylene diglycidyl ether, polyglycol diglycidyl ether and polypropylene glycol diglycidyl ether; triglycidyl ethers such as trimethylolpropane triglycidyl ether and glycerin triglycidyl ether; vinylhexene oxides such as 4-vinylcyclohexene monooxide, vinylcyclohexene dioxide and methylated vinylcyclohexene dioxide; and the like.

These diluents may be used either alone or in combination of two or more kinds.

The diluent is used in the solid content of the curable composition according to one embodiment of the invention of preferably 50 mass % to less than 100 mass %, more preferably 60 to 90 mass %, and even more preferably 70 to 85 mass %.

When the curable composition according to one embodiment of the invention contains a diluent, the total amount of the component (A), the component (B) and the component (C) is preferably 50 to 100 mass %, and more preferably 60 to 100 mass % based on the whole components excluding the diluent of the curable composition. When the total amount of the component (A), the component (B) and the component (C) is within the above range, the cured product of the curable composition according to one embodiment of the invention is more excellent in heat resistance and adhesiveness.

The curable composition according to one embodiment of the invention may further contain other components in the above components unless the object of the present invention is impaired.

Examples of other components include an antioxidant, a UV absorber, a light stabilizer and the like.

The antioxidant is added to prevent oxidative degradation during heating. Examples of the antioxidant include a phosphorus-based antioxidant, a phenol-based antioxidant, a sulfur-based antioxidant, and the like.

Examples of the phosphorus-based antioxidant include phosphites, oxaphosphaphenanthrene oxides and the like. Examples of the phenol-based antioxidant include monophenols, bisphenols, polymeric phenols and the like. Examples of the sulfur-based antioxidant include dilauryl-3,3'-thiodipropionate, dimyristyl-3,3'-thiodipropionate, distearyl-3,3'-thiodipropionate and the like.

These antioxidants may be used either alone or in combination of two or more kinds. The antioxidant is normally used in an amount of 10 mass % or less based on the component (A).

The UV absorber is added for the purpose of improving a light resistance of the obtained cured product.

Examples of the UV absorber include salicylic acids, benzophenones, benzotriazoles, hindered amines and the like.

The UV absorber may be used either alone or in combination of two or more kinds.

The UV absorber is normally used in an amount of 10 mass % or less based on the component (A).

The light stabilizer is added for the purpose of improving the light resistance of the obtained cured product.

Examples of the light stabilizer include e.g. hindered amines such as poly[{6-(1,1,3,3-tetramethylbutyl)amino-1,3,5-triazin-2,4-diyl}{(2,2,6,6-tetramethyl-4-piperidine) imino} hexamethylene{(2,2,6,6-tetramethyl-4-piperidine) imino}].

These light stabilizers may be used either alone or in combination of two or more kinds.

These other components are normally used in a total amount of 20 mass % or less based on the component (A).

The curable composition according to one embodiment of the invention can be prepared e.g. by mixing the component (A), the component (B), the component (C), and optionally other components at a predetermined ratio and defoaming it.

The mixing method and defoaming method are not particularly limited, and known methods can be used.

As described above, the curable composition according to one embodiment of the invention contains the component (A), the component (B) and the component (C) as essential components.

Such a curable composition according to one embodiment of the invention is excellent in workability in coating process.

That is, when the curable composition according to one embodiment of the invention is discharged from the discharge pipe and then the discharge pipe is raised, the cobwebbing level is low or the cobwebbing is immediately discontinued. Thus, when the curable composition according to one embodiment of the invention is used, the circumference is not contaminated by resin splash.

In addition, the curable composition according to one embodiment of the invention prevents peripheral contamination due to spread of droplets after application.

From the viewpoint of more excellent workability in coating process, the viscosity of the curable composition is preferably 2 to 10 Pa·s, and more preferably 4 to 8 Pa·s as measured at 25° C. and 200 $s^{-1}$ using an E-type viscometer.

In addition, when the curable composition according to one embodiment of the invention is used, a cured product excellent in adhesiveness, peeling resistance and heat resistance can be obtained.

Hence, the curable composition according to one embodiment of the invention is suitably used as a raw material for optical components and formed articles, an adhesive, a coating agent or the like. In particular, the curable composition according to one embodiment of the invention can be suitably used as a composition for fixing the optical element, because the problem related to the deterioration of the optical element-fixing material accompanying the enhanced luminance of the optical element can be solved.

2) Cured Product

The cured product according to one embodiment of the invention is obtained by curing the curable composition according to one embodiment of the invention.

The method for curing the curable composition according to one embodiment of the invention is exemplified by thermal curing. The heating temperature in curing is normally 100 to 200° C., and the heating time is normally 10 minutes to 20 hours, and preferably 30 minutes to 10 hours.

The cured product according to one embodiment of the invention is excellent in adhesiveness, peel resistance and heat resistance.

Thus, the cured product according to one embodiment of the invention can be suitably used as an optical element-fixing material capable of solving the problem related to deterioration accompanying the enhanced luminance of the optical element.

The excellent peeling resistance of the cured product according to one embodiment of the invention can be confirmed e.g. as follows. That is, a curable composition is applied to an LED lead frame, furthermore press-bonded with a sapphire chip, cured by heat treatment at 170° C. for 2 hours, and then a sealant is poured into the cup, heated at 150° C. for 1 hour to obtain a test piece of a cured product. The test piece is exposed to an environment at 85° C. and 85% RH for 168 hours, then treated by IR reflow under a condition of a preheating temperature of 160° C., maximum temperature of 260° C. and a heating time of 1 minute, and then subjected to 300-cycle test, where in one cycle, it is left at −40° C. for 30 minutes and left at +100° C. for 30 minutes in a thermal cycle tester. Subsequently, the sealant is removed, and at this time, it is checked whether or not the element is peeled off together. In the cured product according to one embodiment of the invention, the probability of peeling is normally 45% or lower, and more preferably 25% or lower.

The excellent adhesiveness and heat resistance of the cured product according to one embodiment of the invention can be confirmed e.g. in the following manner. That is, the curable composition according to one embodiment of the invention is applied on a mirror surface of a silicon chip, the coated surface is placed on the adherend, press-bonded, and heated to cure it. This is left on the measurement stage of a bond tester which has been previously heated to a predetermined temperature (e.g. 23° C., 100° C.) for 30 seconds, stressed in a direction parallel to the adhesive surface (shear direction) from a height of 50 μm above the adherend to measure the adhesive strength between the test piece and the adherend.

The adhesive strength of the cured product is preferably 60 N/2 mm square or higher, more preferably 80 N/2 mm square or higher, and particularly preferably 100 N/2 mm square or higher, at 23° C. In addition, the adhesive strength of the cured product is preferably 40 N/2 mm square or higher, more preferably 50 N/2 mm square or higher, and particularly preferably 60 N/2 mm square or higher, at 100° C.

3) Method for Using Curable Composition

The method according to one embodiment of the invention is a method for using the curable composition according to one embodiment of the invention as an adhesive or sealant for an optical element-fixing material.

Examples of the optical element include a light emitter such as LED and LD, a light-receiving element, a composite optical element, an optical integrated circuit, and the like.

An optical device obtained by using the curable composition according to one embodiment of the invention as an adhesive or sealant for an optical element-fixing material is a device excellent in durability, in which the optical element is fixed with a high adhesive strength.

<Adhesive for Optical Element-Fixing Material>

The curable composition according to one embodiment of the invention can be suitably used as an adhesive for an optical element-fixing material.

The method for using the curable composition according to one embodiment of the invention as an adhesive for an optical element-fixing material is exemplified by a method in which the composition is applied to one or both of adhesive surfaces of materials to be adhered (optical element, substrate thereof, etc.), press-bonded, then thermally cured to firmly adhere the both materials to be adhered to each other. An application amount of the curable composition according to one embodiment of the invention is not particularly limited as long as it is within an amount that allows firm adhesion between the materials to be adhered by curing. Normally the amount allows the coating film of the curable composition to have a thickness of 0.5 to 5 μm, and preferably 1 to 3 μm.

Examples of the substrate material for bonding the optical element include glasses such as soda-lime glass and heat-resistant hard glass; ceramics; sapphire; metals such as iron, copper, aluminum, gold, silver, platinum, chromium, titanium and alloys of these metals, and stainless steel (SUS302, SUS304, SUS304L, SUS309, etc.); synthetic resins such as polyethylene terephthalate, polybutylene terephthalate, polyethylene naphthalate, ethylene-vinyl acetate copolymer, polystyrene, polycarbonate, polymethylpentene, polysulfone, polyetheretherketone, polyethersulfone, polyphenylene sulfide, polyether imide, polyimide, polyamide, acrylic resin, norbornene-based resin, cycloolefin resin and glass epoxy resin; and the like.

The heating temperature during thermal curing depends on the curable composition and the like for use, but is normally 100 to 200° C. The heating time is normally 10 minutes to 20 hours, and preferably 30 minutes to 10 hours.

<Sealant for Optical Element-Fixing Material>

The curable composition according to one embodiment of the invention can be suitably used as a sealant for an optical element-fixing material.

The method for using the curable composition according to one embodiment of the invention as a sealant for an optical element-fixing material is exemplified by a method in which the composition is formed into a desired shape to obtain a formed article involving an optical element, and then the article is thermally cured to produce an optical element sealant, and the like.

The method for forming the curable composition according to one embodiment of the invention into a desired shape is not particularly limited, and a normal transfer forming method and a known mold method such as a casting method may be adopted.

The heating temperature during thermal curing depends on the curable composition and the like for use, but is normally 100 to 200° C. The heating time is normally 10 minutes to 20 hours, and preferably 30 minutes to 10 hours.

Since the obtained optical element sealant uses the curable composition according to one embodiment of the invention, it is excellent in peeling resistance, heat resistance and has a high adhesive strength.

EXAMPLES

Next, the present invention will be described in more detail with reference to Examples and Comparative Examples, but the present invention is not limited to the following Examples. The units "%" and "parts" respectively refer to "mass %" and "parts by mass" unless otherwise indicated.

(Measurement of Average Molecular Weight)

The mass-average molecular weight (Mw) and the number average molecular weight (Mn) of the silane compound polymer obtained in Production Example 1 were measured as standard polystyrene-equivalent values by the following apparatus under the following conditions.

Apparatus name: HLC-8220 GPC, manufactured by Tosoh Corporation
Column: a column prepared by sequentially connecting TSKgel GMHXL, TSKgel GMHXL and TSKgel 2000HXL
Solvent: tetrahydrofuran
Injection volume: 80 μl
Measurement temperature: 40° C.

Flow rate: 1 ml/min
Detector: differential refractometer
(Measurement of IR Spectrum)

The IR spectrum of the silane compound polymer obtained in Production Example 1 was measured using a Fourier transform infrared spectrophotometer (Spectrum 100, manufactured by PerkinElmer, Inc.).

Production Example 1

71.37 g (400 mmol) of methyltriethoxysilane (product name: "KBE-13", manufactured by Shin-Etsu Chemical Co., Ltd.) was charged in a 300 ml eggplant flask, to which subsequently a solution prepared by dissolving 0.10 g of 35% hydrochloric acid (0.25 mol % based on the total amount of the silane compound) in 21.6 ml of distilled water was added while stirring, and the whole content was stirred at 30° C. for 2 hours, then heated to 70° C. and stirred for 5 hours, to which subsequently 140 g of propyl acetate was added. To this mixture, 0.12 g of 28% ammonia water (0.5 mol % based on the total amount of the silane compound) was added while stirring the whole content, which was heated to 70° C., and further stirred for 3 hours. Purified water was added to the reaction solution, which was subjected to liquid-liquid separation, and this operation was repeated until the pH of the aqueous layer reached 7. The organic layer was concentrated by an evaporator, and the concentrate was vacuum-dried to obtain 55.7 g of a silane compound polymer (A1). This had a mass-average molecular weight (Mw) of 7800 and a molecular weight distribution (Mw/Mn) of 4.52.

IR spectrum data of the silane compound polymer (A1) are shown below.

Si—$CH_3$: 1272 $cm^{-1}$, 1409 $cm^{-1}$, Si—O: 1132 $cm^{-1}$

The compounds and the like used in Examples and Comparative Examples are shown below.
(Component A)
Silane compound polymer (A1): the curable polysilsesquioxane compound obtained in Production Example 1
(Compound B)
Particulate (B1): a silica particulate (product name "AEROSIL RX 300", manufactured by NIPPON AEROSIL CO., LTD., average primary particle diameter: 7 nm, specific surface area: 210 $m^2/g$)
Particulate (B2): a silica particulate (product name "AEROSIL R805", manufactured by NIPPON AEROSIL CO., LTD., average primary particle diameter: 12 nm, specific surface area: 150 $m^2/g$)
Particulate (B3): a silica particulate (product name "AEROSIL RY300", manufactured by NIPPON AEROSIL CO., LTD., average primary particle size: 7 nm, specific surface area: 125 $m^2/g$)
Particulate (B4): a silica particulate (product name "AEROSIL RX200", manufactured by NIPPON AEROSIL CO., LTD., average primary particle diameter: 12 nm, specific surface area: 140 $m^2/g$)
(Component C)
Particulate (C1): a silicone-based particulate (product name "MSP-SN08", manufactured by NIKKO RICA CORPORATION, average primary particle diameter: 0.8 μm, shape: sphere)
Particulate (C2): a silicone-based particulate (product name "Tospearl 120" manufactured by Momentive Performance Materials Japan, average primary particle diameter: 2 μm, shape: sphere)
Particulate (C3): a silicone-based particulate (product name "Tospearl 145", manufactured by Momentive Performance Materials Japan, average primary particle diameter: 4.5 μm, shape: sphere)
Particulate (C4): a silicone-based particulate (product name "MSP-SN05", manufactured by NIKKO RICA CORPORATION, average primary particle diameter: 0.5 μm, shape: sphere)
Component (D)
Silane coupling agent (D1): 1,3,5-N-tris[3-(trimethoxysilyl)propyl] isocyanurate (product name "KBM-9659" manufactured by Shin-Etsu Chemical Co., Ltd.)
Component (E)
Silane coupling agent (E1): 3-(trimethoxysilyl) propylsuccinic anhydride (product name "X-12-967C", manufactured by Shin-Etsu Chemical Co., Ltd.)

Example 1

To 100 parts of the silane compound polymer (A1), 20 parts of the particulate (B1), 5 parts of the particulate (C1), 10 parts of the silane coupling agent (D1) and 3 parts of the silane coupling agent (E1) were added, to which diethyleneglycol monobutylether acetate was further added as a diluent so that the viscosity measured under a condition of 25° C. and 200 $s^{-1}$ using an E-type viscometer was 4.5 Pa·s, and the whole content was thoroughly mixed and defoamed to obtain a curable composition.

Examples 2 to 6 and Comparative Examples 1 to 8

Curable compositions were obtained in the same manner as in Example 1 except that the compositions were changed to those described in Table 1.

TABLE 1

|  | Silane compound polymer (A1) Compounding ratio (parts) | Particulate (B1) Compounding ratio (parts) | Particulate (C1) Compounding ratio (parts) | Particulate (C2) Compounding ratio (parts) | Particulate (C3) Compounding ratio (parts) | Compounding ratio of silane coupling agent (parts) | |
|---|---|---|---|---|---|---|---|
|  |  |  |  |  |  | (D1) | (E1) |
| Example 1 | 100 | 20 | 5 | — | — | 10 | 3 |
| Example 2 | 100 | 20 | 10 | — | — | 10 | 3 |
| Example 3 | 100 | 20 | — | 5 | — | 10 | 3 |
| Example 4 | 100 | 20 | — | 10 | — | 10 | 3 |
| Example 5 | 100 | 20 | — | — | 5 | 10 | 3 |
| Example 6 | 100 | 20 | — | — | 10 | 10 | 3 |

TABLE 1-continued

| | Silane compound polymer (A1) Compounding ratio (parts) | Particulate (B1) Compounding ratio (parts) | Particulate (C1) Compounding ratio (parts) | Particulate (C2) Compounding ratio (parts) | Particulate (C3) Compounding ratio (parts) | Compounding ratio of silane coupling agent (parts) | |
|---|---|---|---|---|---|---|---|
| | | | | | | (D1) | (E1) |
| Comparative Example 1 | 100 | — | — | — | — | — | — |
| Comparative Example 2 | 100 | 0.1 | — | — | — | — | — |
| Comparative Example 3 | 100 | 5 | — | — | — | — | — |
| Comparative Example 4 | 100 | 10 | — | — | — | — | — |
| Comparative Example 5 | 100 | 15 | — | — | — | — | — |
| Comparative Example 6 | 100 | 20 | — | — | — | — | — |
| Comparative Example 7 | 100 | 60 | — | — | — | — | — |
| Comparative Example 8 | 100 | 15 | — | — | — | 10 | 3 |

Examples 7 to 31

Curable compositions were obtained in the same manner as in Example 1 except that the silane compound polymer (A), the particulate (B), the particulate (C), the silane coupling agent (D) and the silane coupling agent (E) were used in the compositions shown in the following Table 3 and mixtures prepared by mixing diethyleneglycol monobutylether acetate (S1), tripropyleneglycol n-butylether (S2) and 1,6-hexanediol diacetate (S3) in mixing ratios described in the following Table 2 were used as diluents in Example 1.

TABLE 2

| | Mixing ratio of diluent (parts) | | |
|---|---|---|---|
| | S1 | S2 | S3 |
| Example 7 | 50 | 50 | — |
| Example 8 | 50 | 50 | — |
| Example 9 | 50 | 50 | — |
| Example 10 | 50 | 50 | — |
| Example 11 | 50 | 50 | — |
| Example 12 | 50 | 50 | — |
| Example 13 | 50 | 50 | — |
| Example 14 | 50 | 50 | — |
| Example 15 | 50 | 50 | — |
| Example 16 | 50 | 50 | — |
| Example 17 | 50 | 50 | — |
| Example 18 | 50 | 50 | — |
| Example 19 | 50 | 50 | — |
| Example 20 | 50 | 50 | — |
| Example 21 | 50 | 50 | — |
| Example 22 | 50 | 50 | — |
| Example 23 | — | 100 | — |
| Example 24 | — | — | 100 |
| Example 25 | 50 | — | 50 |
| Example 26 | — | 50 | 50 |
| Example 27 | 30 | 40 | 30 |
| Example 28 | 50 | 50 | — |
| Example 29 | 50 | 50 | — |
| Example 30 | 50 | 50 | — |
| Example 31 | 50 | 50 | — |

TABLE 3

| | Silane compound polymer (A1) Compounding ratio (parts) | Particulate (B1) Compounding ratio (parts) | Particulate (B2) Compounding ratio (parts) | Particulate (B3) Compounding ratio (parts) | Particulate (B4) Compounding ratio (parts) | Particulate (C1) Compounding ratio (parts) | Particulate (C2) Compounding ratio (parts) | Particulate (C3) Compounding ratio (parts) | Particulate (C4) Compounding ratio (parts) | Compounding ratio of silane coupling agent (parts) | |
|---|---|---|---|---|---|---|---|---|---|---|---|
| | | | | | | | | | | (D1) | (E1) |
| Example 7 | 100 | — | 30 | — | — | 10 | — | — | — | 30 | 5 |
| Example 8 | 100 | — | — | 30 | — | 10 | — | — | — | 30 | 5 |
| Example 9 | 100 | — | — | — | 30 | 10 | — | — | — | 30 | 5 |
| Example 10 | 100 | — | — | — | 50 | 10 | — | — | — | 30 | 5 |
| Example 11 | 100 | — | — | — | 70 | 10 | — | — | — | 30 | 5 |
| Example 12 | 100 | — | — | — | 30 | — | 10 | — | — | 30 | 5 |
| Example 13 | 100 | — | — | — | 30 | — | — | 10 | — | 30 | 5 |
| Example 14 | 100 | — | — | — | 30 | — | — | — | 10 | 30 | 5 |
| Example 15 | 100 | — | — | 30 | — | — | — | — | 5 | 30 | 5 |
| Example 16 | 100 | — | — | 30 | — | — | — | — | 20 | 30 | 5 |
| Example 17 | 100 | — | — | 30 | — | — | — | — | 30 | 30 | 5 |

TABLE 3-continued

| | Silane compound polymer (A1) Compounding ratio (parts) | Particulate (B1) Compounding ratio (parts) | Particulate (B2) Compounding ratio (parts) | Particulate (B3) Compounding ratio (parts) | Particulate (B4) Compounding ratio (parts) | Particulate (C1) Compounding ratio (parts) | Particulate (C2) Compounding ratio (parts) | Particulate (C3) Compounding ratio (parts) | Particulate (C4) Compounding ratio (parts) | Compounding ratio of silane coupling agent (parts) (D1) | (E1) |
|---|---|---|---|---|---|---|---|---|---|---|---|
| Example 18 | 100 | — | — | — | 30 | — | — | — | 10 | 10 | 5 |
| Example 19 | 100 | — | — | — | 30 | — | — | — | 10 | 50 | 5 |
| Example 20 | 100 | — | — | — | 30 | — | — | — | 10 | 70 | 5 |
| Example 21 | 100 | — | — | — | 30 | — | — | — | 10 | 30 | 3 |
| Example 22 | 100 | — | — | — | 30 | — | — | — | 10 | 30 | 20 |
| Example 23 | 100 | — | — | — | 30 | 10 | — | — | — | 50 | 5 |
| Example 24 | 100 | — | — | — | 30 | 10 | — | — | — | 30 | 5 |
| Example 25 | 100 | — | — | — | 30 | 10 | — | — | — | 30 | 5 |
| Example 26 | 100 | — | — | — | 30 | 10 | — | — | — | 30 | 5 |
| Example 27 | 100 | — | — | — | 30 | 10 | — | — | — | 30 | 5 |
| Example 28 | 100 | 30 | — | — | — | 10 | — | — | — | 30 | 5 |
| Example 29 | 100 | 30 | — | — | — | — | 10 | — | — | 30 | 5 |
| Example 30 | 100 | 30 | — | — | — | — | — | 10 | — | 30 | 5 |
| Example 31 | 100 | 30 | — | — | — | — | — | — | 10 | 30 | 5 |

The curable compositions obtained in Examples and Comparative Examples were respectively subjected to the following tests. The results are shown in Table 4.

(Adhesive Strength)

The curable composition was applied on a mirror surface of a silicon chip with a size of 2 mm square so as to have a thickness of about 2 μm, and the applied surface was placed on an adherend (silver-plated copper plate) and press-bonded, which was subsequently cured by heat treatment at 170° C. for 2 hours to obtain an adherend with a test piece. This adherend with the test piece was left for 30 seconds on the measurement stage of a bond tester (Series 4000, manufactured by Dage Japan Co. Ltd.) which hasd been previously heated to a predetermined temperature (23° C., 100° C.), which was stressed in a direction parallel to the adhesive surface (shear direction) from a height of 50 μm above the adherend at a speed of 200 μm/s to measure the adhesive strength (N/2 mm square) between the test piece and the adherend at 23° C. and 100° C.

(Peeling Resistance Test)

On a LED lead frame (product name "5050 D/G PKG LEADFRAME", manufactured by ENOMOTO Co., Ltd.), the curable composition was applied in a size of about 0.4 mmø, on which a sapphire chip with a size of 0.5 mm square was press-bonded. Then, it was cured by heat treatment at 170° C. for 2 hours, then a sealant (product name "EG 6301", manufactured by Shin-Etsu Chemical Co., Ltd.) was poured into the cup, and heated at 150° C. for 1 hour to obtain a test piece.

This test piece was exposed to an environment of 85° C. and 85% RH for 168 hours, and then treated by IR reflow (reflow furnace: product name "WL-15-20DNX type", manufactured by Sagami-Rikou Co. Ltd.) under a condition of a preheating temperature of 160° C., maximum temperature of 260° C. and a heating time of 1 minute. Subsequently, the test piece was subjected to 300-cycle test, where in one cycle, it was left at −40° C. for 30 minutes and left at +1000C for 30 minutes in a thermal cycle tester. Then, the sealant was removed, and at this time, it was checked whether or not the element was peeled off together. This test was repeated multiple times for each curable composition. The number of times that the elements were peeled together (NG number) was counted to calculate an incidence of peeling [NG rate=(NG number/total number)×100]. A case where the incidence was 25% or lower was rated as "A", a case of higher than 25% to 50% was rated as "B", and a case of higher than 50% was rated as "C".

(Workability Evaluation 1: Height of Cobwebbing)

The curable composition was charged in a syringe, defoamed, and then applied in a size of about 1 mmø by a dispenser (product name "SHOTMASTER 300", manufactured by Musashi Engineering, Inc.) using a needle with an outer diameter of 0.56 mm, an inner diameter of 0.31 mm and a length of 8 mm, under a condition of a discharge pressure of 300 kPa and a discharge time of 150 to 400 msec to measure a height of cobwebbing when the needle was detached.

There is a tendency that a curable composition having a high cobwebbing height may cause peripheral contamination due to resin splash, while applied droplets are hard to spread.

(Workability Evaluation 2: Ease of Disappearance of the Applied Droplets on the Protrusion)

The curable composition was charged in a syringe, defoamed, and then applied in a size of about 1 mmø by a dispenser (product name "SHOTMASTER 300", manufactured by Musashi Engineering, Inc.) using a needle with an outer diameter of 0.56 mm, an inner diameter of 0.31 mm and a length of 8 mm, under a condition of a discharge pressure of 300 kPa and a discharge time of 150 to 400 msec.

The presence or absence of a change in the shape of the applied solution immediately after application and after 30 minutes of application was confirmed by a digital microscope (product name "Digital Microscope VHX-1000", manufactured by KEYENCE CORPORATION) to evaluate the ease of disappearance of the curable composition on the protrusion (raised portion at the center of the applied droplet) in accordance with the following criteria.

A: Most of the protrusion disappeared.

B: The protrusion disappeared a little.

C: No protrusion disappeared.

A curable composition in which the protrusion is hard to disappear and the height of the cobwebbing is high tends to easily cause resin splash.

(Workability Evaluation 3: Resin Splash)

The curable composition was charged in a syringe, defoamed, and then continuously applied in a size of about 1 mmø by a dispenser (product name "SHOTMASTER 300", manufactured by Musashi Engineering, Inc.) using a needle with an outer diameter of 0.56 mm, an inner diameter of 0.31 mm and a length of 8 mm, under a condition of a discharge pressure of 300 kPa and a discharge time of 150 to 400 msec. At this time, in accordance with the following criteria, it was evaluated whether or not resin splash (a phenomenon that the curable composition drips to the subsequent application point) was caused, resulting in peripheral contamination, in accordance with the following criteria.

A: The string immediately broke and did not contaminate the circumference.
B: The string broke during movement of the needle but did not contaminate the circumference.
F: The string did not break, and the circumference was contaminated by resin splash.

(Workability Evaluation 4: Difficulty of Wetting Spread of the Applied Droplet)

The curable composition was charged in a syringe, defoamed, and then applied in a size of about 0.4 mmø by a dispenser (product name "SHOTMASTER 300", manufactured by Musashi Engineering, Inc.) using a needle with an outer diameter of 0.56 mm, an inner diameter of 0.31 mm and a length of 8 mm, under a condition of a discharge pressure of 300 kPa and a discharge time of 150 to 400 msec. The sizes of droplet of the applied solution immediately after application and after 30 minutes of application were observed by a digital microscope (product name "Digital Microscope VHX-1000", manufactured by KEYENCE CORPORATION) to evaluate difficulty of wetting spread of the curable composition in accordance with the following criteria.

A: The size of the droplet little changed.
F: Wetting spread and the size of the droplet increased.

TABLE 4

| | Adhesive strength (N/2 mm square) | | Peeling resistance | Height of cobwebbing (mm) | Evaluation of workability | | |
|---|---|---|---|---|---|---|---|
| | | | | | Ease of disappearance of the applied droplets on the protrusion | Resin splash | Difficulty of wetting spread of the applied droplet |
| | 23° C. | 100° C. | Evaluation | | | | |
| Example 1 | 113.5 | 74.3 | A | 1.7 | B | A | A |
| Example 2 | 116.3 | 66.7 | A | 1.5 | B | A | A |
| Example 3 | 135.3 | 73.6 | A | 1.8 | B | A | A |
| Example 4 | 105.8 | 80.3 | A | 1.6 | B | A | A |
| Example 5 | 109.7 | 73.4 | A | 1.7 | B | A | A |
| Example 6 | 93.8 | 70.4 | A | 1.4 | B | A | A |
| Comparative Example 1 | 40.0 | 33.7 | C | 0.0 | A | A | F |
| Comparative Example 2 | 40.4 | 35.6 | C | 0.0 | A | A | F |
| Comparative Example 3 | 38.8 | 33.9 | C | 5.0 | B | B | A |
| Comparative Example 4 | 39.1 | 32.2 | C | 4.7 | B | A | A |
| Comparative Example 5 | 41.3 | 29.9 | C | 3.6 | B | A | A |
| Comparative Example 6 | 42.9 | 30.7 | C | 1.8 | B | A | A |
| Comparative Example 7 | 37.9 | 31.7 | C | 1.3 | B | A | A |
| Comparative Example 8 | 100.3 | 69.6 | B | 3.7 | B | A | A |
| Example 7 | 118.1 | 78.6 | A | 1.3 | B | A | A |
| Example 8 | 115.7 | 80.1 | A | 1.5 | B | A | A |
| Example 9 | 126.8 | 85.6 | A | 1.7 | B | A | A |
| Example 10 | 108.6 | 76.3 | A | 1.6 | B | A | A |
| Example 11 | 105.4 | 75.6 | A | 1.5 | B | A | A |
| Example 12 | 121.6 | 82.2 | A | 1.6 | B | A | A |
| Example 13 | 120.0 | 90.2 | A | 1.5 | B | A | A |
| Example 14 | 106.9 | 79.9 | A | 1.6 | B | A | A |
| Example 15 | 141.0 | 86.6 | A | 1.4 | B | A | A |
| Example 16 | 111.1 | 72.2 | A | 1.5 | B | A | A |
| Example 17 | 101.1 | 75.9 | A | 1.4 | B | A | A |
| Example 18 | 112.0 | 78.4 | A | 1.2 | B | A | A |
| Example 19 | 128.9 | 80.3 | A | 1.8 | B | A | A |
| Example 20 | 136.7 | 89.5 | A | 2.0 | B | A | A |
| Example 21 | 122.2 | 79.8 | A | 1.5 | B | A | A |
| Example 22 | 153.0 | 99.9 | A | 1.2 | B | A | A |
| Example 23 | 127.1 | 88.2 | A | 2.0 | B | A | A |
| Example 24 | 115.6 | 77.5 | A | 1.4 | B | A | A |
| Example 25 | 114.9 | 74.1 | A | 1.6 | B | A | A |
| Example 26 | 125.1 | 81.1 | A | 1.6 | B | A | A |
| Example 27 | 119.2 | 74.2 | A | 1.8 | B | A | A |
| Example 28 | 135.6 | 76.5 | A | 1.0 | B | A | A |
| Example 29 | 120.5 | 85.2 | A | 1.1 | B | A | A |
| Example 30 | 117.6 | 92.2 | A | 1.2 | B | A | A |
| Example 31 | 123.4 | 77.7 | A | 1.1 | B | A | A |

The followings can be seen from Table 4.

The curable compositions in Examples 1 to 31 provides a cured product excellent in workability during coating, and in adhesiveness, peeling resistance and heat resistance.

On the other hand, the curable composition in Comparative Example 1 containing no component (B) nor component (C) is poor in workability during coating, and the obtained cured product is poor in adhesiveness, peeling resistance and heat resistance.

In addition, the curable compositions in Comparative Examples 2 to 8 containing no component (C) provides a cured product poor in workability during application or in any performance of adhesiveness, peeling resistance and heat resistance.

The invention claimed is:

1. A curable composition comprising the following component (A), component (B) and component (C), Component (A): a curable polysilsesquioxane compound having a repeating unit represented by the following formula (a-1):

$$R^1SiO_{3/2} \tag{a-1}$$

wherein $R^1$ represents an alkyl group having 1 to 10 carbon atoms with or without substituents, or an aryl group with or without substituents, Component (B): a particulate having an average primary particle diameter of 5 to 40 nm, Component (C): a particulate having an average primary particle diameter of larger than 0.04 μm to 8 μm, wherein a mass ratio between the component (A) and the component (B) [component (A):component (B)] is 100:0.3 to 100:90; and wherein a mass ratio between the component (A) and the component (C) [component A:component (C)] is 100:0.3 to 100:40.

2. The curable composition according to claim 1, wherein a mass-average molecular weight (Mw) of the curable polysilsesquioxane compound of the component (A) is 800 to 30,000.

3. The curable composition according to claim 1, wherein the component (A) is obtained by polycondensing at least one compound represented by the following formula (a-2) in the presence of the polycondensation catalyst, $$R^1Si(OR^2)_x(X^1)_{3-x} \tag{a-2}$$

wherein $R^1$ represents the same as described above, $R^2$ represents an alkyl group having 1 to 10 carbon atoms, $X^1$ represents a halogen atom, and x represents an integer of 0 to 3, each of the plural $R^2$ and the plural $X^1$ may be the same or different from each other.

4. The curable composition according to claim 1, wherein the component (C) is at least one particulate selected from a group consisting of silica, silicone and a metal oxide having a surface coated with silicone.

5. The curable composition according to claim 1, further comprising the following component (D):

Component (D): a silane coupling agent having a nitrogen atom in its molecule.

6. The curable composition according to claim 1, further comprising the following component (E), Component (E): a silane coupling agent having an acid anhydride structure in its molecule.

7. The curable composition according to claim 1, further comprising a diluent, wherein a solid content is 50 mass % to lower than 100 mass %.

8. The curable composition according to claim 7, wherein a total amount of the component (A), component (B), and component (C) is 50 to 100 mass % based on the whole components excluding the diluent in the curable composition.

9. A method for producing the curable composition according to claim 1, having the following steps (I) and (II):

Step (I): the step of obtaining the curable polysilsesquioxane compound by polycondensing at least one compound represented by the following formula (a-2) in the presence of the polycondensation catalyst:

$$R^1Si(OR^2)_x(X^1)_{3-x} \tag{a-2}$$

wherein, $R^1$ represents the same as described above, $R^2$ represents an alkyl group having 1 to 10 carbon atoms, $X^1$ represents a halogen atom, and x represents an integer of 0 to 3, each of plural $R^2$ and plural $X^1$ may be the same or different from each other, Step (II): the step of mixing the curable polysilsesquioxane compound obtained in the step (I), with the component (B) and the component (C).

10. A cured product obtained by curing the curable composition according to claim 1.

11. The cured product according to claim 10, which is an optical element-fixing material.

12. A method for using the curable composition according to claim 1 as an adhesive for the optical element-fixing material.

13. A method for using the curable composition according to claim 1 as a sealant for the optical element-fixing material.

* * * * *